United States Patent
Shang

(10) Patent No.: US 8,825,827 B2
(45) Date of Patent: Sep. 2, 2014

(54) METHOD AND APPARATUS FOR ACQUIRING REAL NAME REGISTRATION STATUS AND TERMINAL

(75) Inventor: Guoqiang Shang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 127 days.

(21) Appl. No.: 13/521,459

(22) PCT Filed: Feb. 21, 2011

(86) PCT No.: PCT/CN2011/071148
§ 371 (c)(1),
(2), (4) Date: Jul. 11, 2012

(87) PCT Pub. No.: WO2011/150700
PCT Pub. Date: Dec. 8, 2011

(65) Prior Publication Data
US 2012/0324080 A1 Dec. 20, 2012

(30) Foreign Application Priority Data
Jun. 4, 2010 (CN) .......................... 2010 1 0200623

(51) Int. Cl.
*G06F 15/173* (2006.01)
(52) U.S. Cl.
USPC ............................ 709/223; 709/224; 709/225
(58) Field of Classification Search
USPC .......................... 709/223, 224–226, 227–229; 370/254–258; 455/435.1, 435.2, 455/410–411
See application file for complete search history.

(56) References Cited

U.S. PATENT DOCUMENTS

| 8,280,354 | B2 * | 10/2012 | Smith et al. ................ | 455/414.1 |
| 8,539,552 | B1 * | 9/2013 | Grabelsky et al. ................ | 726/4 |
| 2004/0203763 | A1 * | 10/2004 | Tammi ........................ | 455/435.1 |
| 2004/0248600 | A1 * | 12/2004 | Kim ............................. | 455/466 |

FOREIGN PATENT DOCUMENTS

| CN | 1747506 | A | | 3/2006 |
| CN | 1780206 | A | | 5/2006 |
| CN | 101166320 | A | | 4/2008 |
| CN | 101272424 | A | * | 9/2008 |
| CN | 101867918 | A | | 10/2010 |

(Continued)

OTHER PUBLICATIONS

International Search Report in international application No. PCT/CN2011/071148, mailed on Jun. 2, 2011.

(Continued)

*Primary Examiner* — Ruolei Zong
(74) *Attorney, Agent, or Firm* — Oppedahl Patent Law Firm LLC

(57) ABSTRACT

A method and an apparatus for acquiring a real name registration status, and a terminal are provided. The method includes: a terminal sends the real name request message to a network, wherein the real name request message is configured to request from the network real name status information, which is used to indicate whether the terminal has performed a real name registration (101); and the terminal receives the real name status information returned by the network in response to the real name request message and displays the real name status information (103). Through the disclosure, the terminal initiates a request for the real name status information so as to acquire the real name status information and present it to a user. The user knows the real name status of the terminal before using the terminal, so that the user experience is improved.

11 Claims, 3 Drawing Sheets

(56) References Cited

FOREIGN PATENT DOCUMENTS

| CN | 101909277 A | 12/2010 |
|---|---|---|
| JP | 2004235924 A | 8/2004 |
| JP | 2009193565 A | 8/2009 |
| KR | 20040081646 A | 9/2004 |

OTHER PUBLICATIONS

English Translation of the Written Opinion of the International Search Authority in international application No. PCT/CN2011/071148, mailed on Jun. 2, 2011.

* cited by examiner

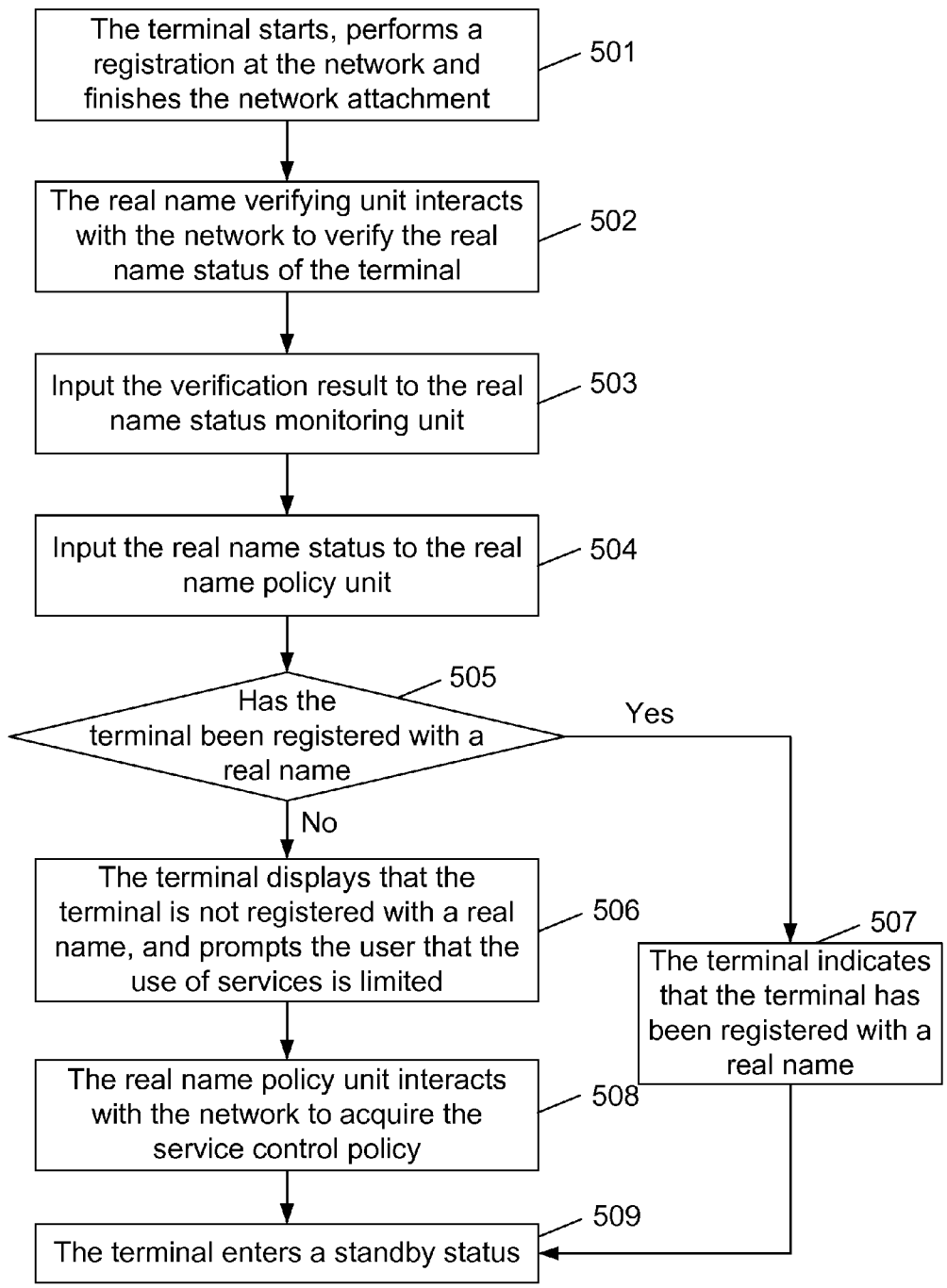

METHOD AND APPARATUS FOR ACQUIRING REAL NAME REGISTRATION STATUS AND TERMINAL

TECHNICAL FIELD

The disclosure relates to the communications, and in particular to a method and an apparatus for acquiring a real name registration status and a terminal.

BACKGROUND

Real name management of a terminal can effectively bond the terminal with the identity of its user, thereby intensively managing and monitoring each terminal and timely finding a user harming the network.

If real name information is registered for the terminal of the user, the network can determine the terminal as a real name terminal, thereby allowing it to normally apply services.

However, if only the network can determine whether a real name registration has been performed for the terminal, and the user has no way to know whether a real name registration has been performed for the terminal, it will bring inconvenience for use of the terminal by the user.

For example, assuming that a terminal is not registered with the real name information, and the user is not sure whether the registration was successful, if, at this time, the terminal is limited in services by the network due to no real name registration, an unfriendly effect will occur, thereby reducing the user experience.

At present, since the terminal cannot notify the user of the real name registration status, the user experience may be reduced. For this problem, there has not been any effective solution.

SUMMARY

To address the problem in the related arts that the terminal cannot notify the user of the real name registration status, which results in a poor user experience, the disclosure provides a method and an apparatus for acquiring the real name registration status and a terminal thereof, so as to definitely notify a user of the real name registration status of the terminal through the terminal and improve the user experience.

In order to solve the technical problem, the technical solution of the disclosure is implemented as follows.

A method for acquiring a real name registration status includes: a terminal sends a real name request message to a network, wherein the real name request message is configured to request from the network for real name status information, which is configured to indicate whether the terminal has performed a real name registration; and after received the real name status information returned by the network in response to the real name request message, the terminal displays the real name status information.

The terminal sends the real name request message to the network in the cases that the terminal has finished network authentication and has not attached to the network, or that the terminal has finished network authentication and has attached to the network, or that the terminal has modified registered real name information, or that the terminal has cancelled the real name registration.

The method may further include: the terminal limits the terminal's use of services according to a saved service control policy, where the real name status information indicates that the terminal has not performed the real name registration.

Before the terminal limits the terminal's use of services, where the real name status information returned by the network indicates that the terminal has not performed the real name registration, the method may further include: the terminal sends a service control policy request message to the network, where the terminal determines that the service control policy is not saved thereon and/or a smart card thereof is changed, wherein the service control policy request message is configured for request for the service control policy.

After the service control policy request message is sent to the network, the method may further include: the terminal directly receives the service control policy returned by the network; or, the terminal acquires the service control policy according to a memory address of the service control policy returned by the network.

After the real name request message is sent, the method may further include: the terminal receives and saves the real name information and an identifier of the real name information returned by the network, wherein the real name information is saved at the network by the terminal after the real name registration has been performed, and the real name information corresponds to the real name status information.

The real name information may include: the identifier of the terminal and the user feature information of the terminal.

The service control policy may include at least one of: limiting a conversation time period of the terminal during a period of time, or forbidding the conversation; and/or, limiting a number of short messages sent by the terminal within a period of time, or forbidding the terminal from applying a short message services.

An apparatus for acquiring a real name registration status, includes:

a request module, configured to send a real name request message to a network, wherein the real name request message is configured to request from the network for real name status information, which is used to indicate whether the terminal in which the request module is located has performed a real name registration;

an acquisition module, configured to receive the real name status information returned by the network in response to the real name request message; and a display module, configured to display the real name status information received by the acquisition module.

The request module is configured to send the real name request message to the network in the cases that the terminal has finished network authentication and has not attached to the network, or that the terminal has finished network authentication and has attached to the network, or that the terminal has modified registered real name information, or that the terminal has cancelled the real name registration.

The apparatus may further include: a processing module, configured to limit the terminal's use of services according to a saved service control policy, where the real name status information received by the acquisition module indicates that the terminal has not performed the real name registration.

The request module may further be configured to send a service control policy request message to the network, where the service control policy is not saved in the terminal and/or a smart card in the terminal is changed, wherein the service control policy request message is used to request for the service control policy.

The acquisition module may further be configured to directly receive the service control policy returned by the network; or, to acquire the service control policy according to a memory address of the service control policy returned by the network.

The acquisition module may further be configured to receive and save the real name information and an identifier of the real name information returned by the network, wherein the real name information is saved at the network by the terminal after the real name registration has been performed, and the real name information corresponds to the real name status information.

The apparatus for acquiring the real name registration status is located in the terminal.

Through the disclosure, the terminal can acquire the real name status information and display it to a user by initiating a request for acquiring the real name status information, and the user may know the real name status of the terminal before using the terminal, so that the user experience is improved and the service scope of the terminal not registered with a real name can be limited in the terminal.

BRIEF DESCRIPTION OF THE DRAWINGS

FIG. 5 is a flowchart showing the process flow of acquiring the real name by the apparatus for acquiring the real name registration status according to one embodiment of the disclosure.

DETAILED DESCRIPTION

To address the problem in the related art that a terminal cannot notify a user of the real name registration status, which results in a poor user experience, the disclosure proposes that the terminal sends the real name request message to the network to request the real name status information, so as to definitely notify the user of the real name registration status of the terminal, and to make the user know whether the terminal is registered with a real name and improve the user experience.

The technical solution of the disclosure is described below with reference to the drawings in detail.

Figure 1:
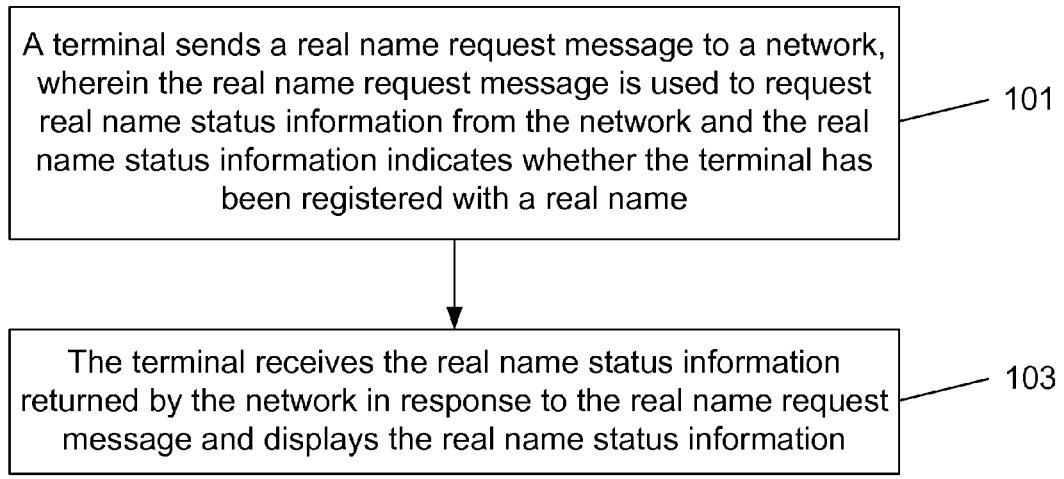
FIG. 1 is a flowchart showing a method for acquiring a real name registration status for the communication of a terminal according to one embodiment of the disclosure.

FIG. 1 is a flowchart showing a method for acquiring the real name registration status for the communication of a terminal according to an embodiment of the disclosure. As shown in FIG. 1, the method includes:

Step 101: The terminal sends a real name request message to the network (the request message may carry an identifier of the terminal (for example, an identifier of a smart card in the terminal)), wherein the real name request message requests from the network real name status information, which indicates whether the terminal has performed a real name registration (i.e., whether the user has been registered with a real name).

Step 103: The terminal receives the real name status information which is returned by the network in response to the real name request message and displays the real name status information.

By the above processing, the terminal can acquire the real name status information and displays it to the user, and the user may know the real name status of the terminal before using the terminal, so that the user experience is improved.

In the actual application, the terminal may send the real name request message to the network in any one of following cases: that the terminal has finished network authentication (after finishing the network authentication, the terminal can communicate with the network) and has not attached to the network (in the case that the terminal has not attached to the network, some services will probably be affected and then will be unavailable due to the non-attachment), or that the terminal has finished network authentication and has attached to the network, or that the terminal has modified registered real name information, or that the terminal has cancelled the real name registration.

In addition, the method may further include: the terminal limits the terminal's use of services, according to a saved service control policy, in the case that the real name status information indicates that the terminal has not performed the real name registration.

Furthermore, the terminal should determine whether a service control policy is saved thereon, and/or whether the smart card in the terminal is changed (for example, SIM (USIM, RSIM, etc.) cards are changed (for example, the user replaces the smart card in the terminal)), before the terminal limits the terminal's use of services in the case that the real name status information returned by the network indicates that the terminal has not performed the real name registration, and the terminal needs to send a service control policy request message to the network, if the determination result meets one of the following conditions: (1) the service control policy is not saved on the terminal, and (2) the smart card in the terminal has been changed. Wherein the service control policy request message sent from the terminal requests the service control policy.

After sending the service control policy request message to the network, the terminal needs to acquire the service control policy in one of the following ways: directly receiving the service control policy returned by the network; or acquiring the service control policy according to a memory address at which the service control policy returned by the network is stored, wherein the memory address returned by the network side may be a network link, according to which the terminal may download the service control policy.

Furthermore, in order to ensure that the terminal can further acquire the registered real name information, after the terminal sends the real name request message, the network may return the real name information registered by the terminal and the real name status information together to the terminal in response to the real name request message, and the network may also return the identifier of the real name information (such as the name of the real name information) along with the real name information. The terminal may receive and save the real name information and the identifier of the real name information returned by the network, wherein the real name information is saved in the network by the terminal after the real name registration has been performed, and the real name information corresponds to the real name status information. The real name information includes the identifier of the terminal and the user feature information of the terminal (such as the identity card number of the user, and the corresponding password information).

In addition, the identifier of the real name information may also be returned to the terminal together with the real name status information when the network returns the real name status information.

Optionally, the service control policy may include: limiting conversation time (the time of calling or the time of answering) of the terminal during a time period, or forbidding the terminal from conversation; and/or, limiting the number of short messages (the number of the received short messages or the total of the sent and received short messages) sent by the terminal within a time period, or forbidding the terminal from applying short message services.

In addition, besides conversation and short message transmission, the services to be limited may further include the MMS, network service of the terminal and so on, and the service control policy may include the limit of the use of services according to traffic, and the specific limiting ways will not be enumerated here.

Optionally, when displaying the real name status information, the terminal may display an icon (or a text) on a display screen, so as to inform the user that the terminal has been registered with the real name information or the terminal has not been registered with the real name information and the communication is limited.

Through the processing, the terminal can acquire the real name status information and display it to the user, and the user may know the real name status of the terminal before using the terminal, so that the user experience is improved and the service scope for the terminal not registered with a real name can be limited in the terminal.

According to one embodiment of the disclosure, an apparatus for acquiring the real name registration status is also provided.

Figure 2:
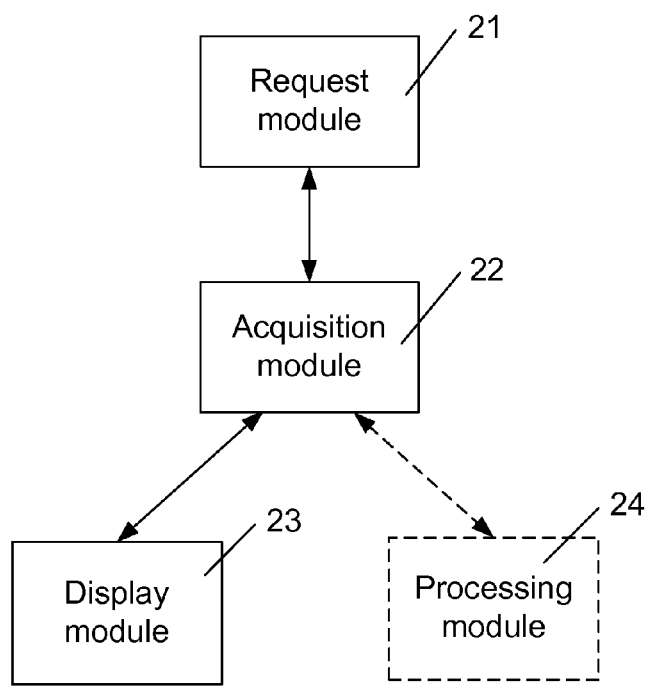
FIG. 2 is a block schematic view of an apparatus for acquiring the real name registration status according to one embodiment of the disclosure.

As shown in FIG. 2, the apparatus for acquiring the real name registration status according to one embodiment of the disclosure includes:

a request module 21 which is configured to send a real name request message to the network, wherein the real name request message is used to request from the network real name status information, which indicates whether the terminal in which the request module is located has performed a real name registration;

an acquisition module 22 which is configured to receive the real name status information returned by the network in response to the real name request message; and a display module 23 which is connected to the acquisition module 22 and configured to display the real name status information received by the acquisition module 22.

Through the processing, the terminal can acquire the real name status information and display it to the user, and the user may know the real name status of the terminal before using the terminal, so that the user experience is improved.

The request module 21 may be configured to send the real name request message to the network in any one of following cases: that the terminal has finished network authentication and has not attached to the network, that the terminal has finished network authentication and has attached to the network, that the terminal has modified registered real name information, or that the terminal has cancelled the real name registration.

The apparatus may further include: a processing module 24 which is configured to limit the terminal's use of services according to a saved service control policy, in the case that the real name status information received by the acquisition module 22 indicates that the terminal has not performed the real name registration.

In addition, the request module 21 may further be configured to send a service control policy request message to the network, in the case that the service control policy is not saved in the terminal and/or a smart card in the terminal is changed, wherein the service control policy request message is used to request the service control policy.

The requesting module 22 may further be configured to directly receive the service control policy returned by the network, or, to acquire the service control policy according to a memory address (such as a link to the location in which the service control policy is saved) of the service control policy returned by the network.

The requesting module 22 may further be configured to receive and save the real name information and an identifier of the real name information returned by the network (which may be the name of the real name information), wherein the real name information is saved in the network by the terminal after the real name registration has been performed, and the real name information corresponds to the real name status information.

Optionally, the service control policy may include at least one of: limiting conversation time of the terminal during a time period, or forbidding the terminal from conversation; and/or, limiting a number of short messages sent by the terminal within a period of time, or forbidding the terminal from applying short message services.

By means of the apparatus, the terminal can acquire the real name status information and display it to the user, and the user may know the real name status of the terminal before using the terminal so that the user experience is improved and the service scope for the terminal not registered with a real name can be limited in the terminal.

Figure 3:
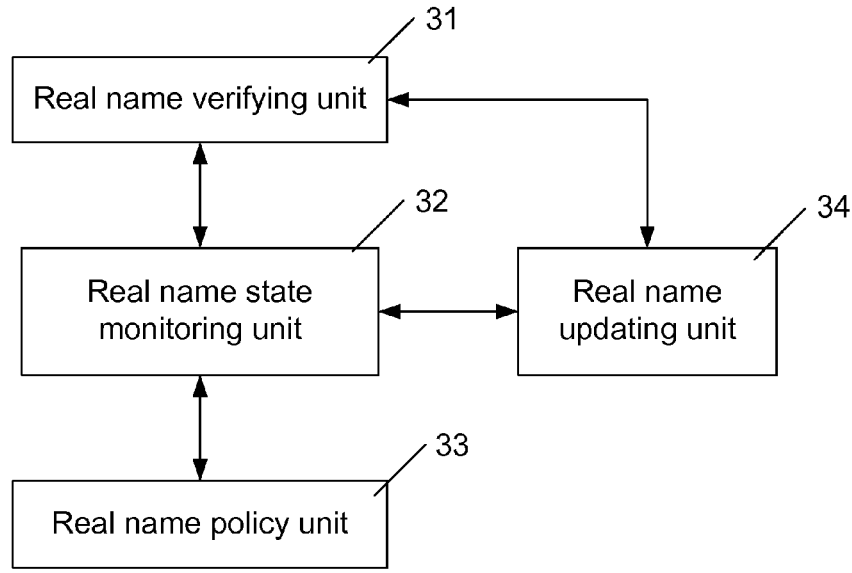
FIG. 3 is a schematic view showing a specific structure example of an apparatus for acquiring the real name registration status according to one embodiment of the disclosure.

FIG. 3 is a block diagram showing a specific structure example of an apparatus for acquiring the real name registration status according to an embodiment of the disclosure. As shown in FIG. 3, in the embodiment, the apparatus for acquiring the real name registration status includes: a real name verifying unit 31, a real name status monitoring unit 32, a real name updating unit 34 and a real name policy unit 33.

The real name verifying unit 31 is configured to interact with the related units of the network and to determine whether the apparatus has been registered with a real name, and is equivalent to having some functions of the request module and acquisition module; the real name status monitoring unit 32 is connected to the real name verifying unit 31 and is configured to receive the verification result of the real name verifying unit, and is equivalent to having the functions of the display module; to maintain the real name status information, and further to receive the update message from the system and provide the real name policy unit 33 with the real name status information, to control implementation of services; the real name policy unit 33 is connected to the real name status monitoring unit 32 and is configured to request the service control policy from the network, to receive the service control policy from the network, and to control the implementation of corresponding services on the apparatus according to the information, and is equivalent to having some functions of the request module and acquisition module and the function of the processing module; the real name updating unit 34 is connected to the real name verifying unit 31 and real name status monitoring unit 32 and is configured to perform a real name registration at the network, after the registration succeeds, the network sends the real name information to the apparatus, and the real name verifying unit 31, real name status monitoring unit 32 and real name policy unit 33 of the apparatus are updated according to the corresponding information to finish the corresponding functions and guarantee the correctness of the real name status.

The function of each module in the apparatus and the processing of acquiring the real name status and controlling service will be described below in detail.

Figure 4:
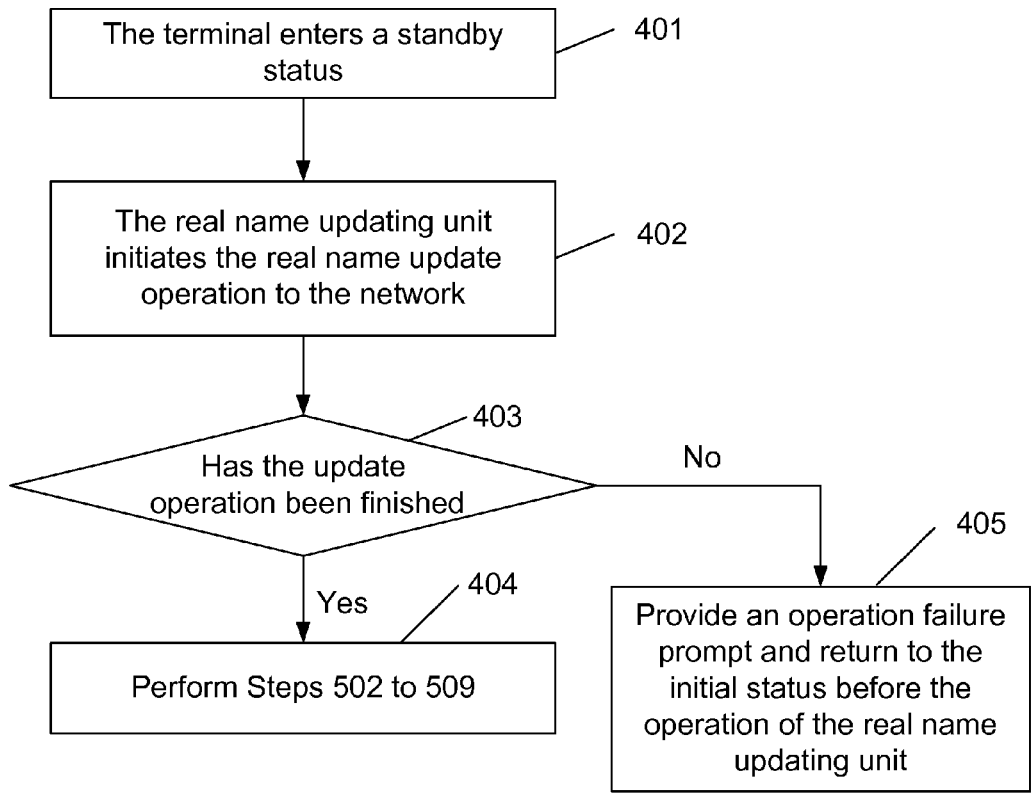
FIG. 4 is a flowchart showing the process flow of updating the real name by the apparatus for acquiring the real name registration status according to one embodiment of the disclosure.

FIG. 4 is a flowchart showing the process of updating real name initiated by the terminal. As shown in FIG. 4, the process specifically includes:

Step 401: The terminal enters the standby status;

Step 402: The real name updating unit initiates the real name update operation to the network;

Step 403: The real name updating unit determines whether the real name update operation is complete, if so, the process turns to Step 404, otherwise, the process turns to Step 405;

Step 404: In the case that a user is allowed to perform real name registration and cancellation, after the operation is complete, the flow of real name verifying operation is initiated, that is, the current real name status is determined by performing Steps 502 to 509 in FIG. 5 and the updated real name information is informed to the terminal; and Step 405: The terminal prompts the failure of the operation and returns to the initial status before the operation of the real name updating unit.

FIG. 5 is the process of acquiring the real name status information after the terminal starts. As shown in FIG. 5, the process specifically includes:

Step 501: The terminal starts, performs a registration at the network (i.e., network registration) and finishes the network attachment;

Step 502: The real name verifying unit interacts with the network and verifies the real name status of the terminal, i.e., the step is to acquire the real name status information of the terminal;

Step 503: The real name verifying unit inputs the verification result to the real name status monitoring unit, wherein the verification result may include the real name status information, that is, whether the terminal is registered with a real name, the name of real name information, etc., such information may be displayed in the standby status in the form of icon or text to prompt the user;

Step 504: The real name status monitoring unit inputs the real name status to the real name policy unit;

Step 505: The real name status monitoring unit determines whether the terminal has performed a real name registration according to the verification result, if so, the process turns to Step 507, otherwise, the process turns to Step 506;

Step 506: The terminal displays that the terminal has not performed a real name registration, and prompts the user that the use of services is limited, and then, the process turns to Step 508;

Step 507: The terminal displays that the terminal has performed a real name registration, and the process turns to Step 509;

Step 508: The real name policy unit interacts with the network to acquire the service control policy; and Step 509: The terminal enters the standby status.

The real name policy unit may save the service control policy acquired from the network as the basis for determining whether the user may use the services when the terminal starts next time. One way is that the network returns the link to service control policy as a response message to the real name policy unit which acquires and saves the service control policy according to the link after receiving the response message; and the other way is that the real name policy unit receives the service control policy directly returned by the network.

Moreover, the real name policy unit can further monitor SIM (USIM, RSIM, etc.) changes in the terminal. If there is no change, it is checked whether the service control policy is saved, if it is not saved, the real name policy unit initiates a service control policy request message. If the SIM (USIM, RSIM, etc.) changes, the real name policy unit directly initiates the service control policy request message.

After the user uses the terminal subsequently, under the circumstance that the terminal initiates a service, the terminal may first check the real name status and directly initiates the corresponding service if a real name registration has been performed; if the terminal is in a non-real name state (i.e., the terminal has not performed a real name registration), the terminal enters a real name service control policy status, at this moment, it is required to limit the initiated service according to the service control policy, for example, for short message service (SMS), the control policy is: at most 10 short messages may be sent within one hour; and when the services initiated by the terminal do not meet the service control policy actually (i.e., the services cannot be performed normally due to the limit of the received service control policy), the terminal is not allowed to continuously perform the services and will prompt the user that it is possible to cancel the limit of using service after the real name registration is complete in time.

It can be seen that the real name can be updated by using the apparatus of this embodiment. The update mainly involves the real name registration and real name cancellation. During the actual real name registration and cancellation, the user may select the operation type through the terminal, such as real name registration and cancellation.

During the real name registration, the user may input various information of user feature, for example, including: valid license type, license information, name, password and other mandatory contents necessary for the real name, submit such information to the network for authentication and wait for the return information; during the real name cancellation, the user submits a request for cancelling the real name operation and waits for the return information from the receiving network; and after receiving the return information from the network, the terminal initiates the process of real name verification, including verifying whether real name is registered, determining whether the service control policy is saved, etc.

The apparatus of this embodiment may be integrated in the terminal or used as an individual apparatus externally connected to the terminal through a universal interface.

To sum up, with the solution of the disclosure above, the terminal can acquire the real name status information, and display the information to a user, such that the user may know the real name status of the terminal before using the terminal, the user experience may be improved and the service scope of the terminal not registered with a real name can be limited in the terminal, and the user can manage the real name information of the terminal, such as query and update.

What described above are only preferred embodiments of the disclosure, and not intended to limit the disclosure; any modifications, equivalent replacements, improvements and the like within the spirit and principle of the invention shall fall within the scope of protection of the disclosure.

The invention claimed is:

1. A method for acquiring a real name registration status, comprising the following steps performed by a terminal:

sending to a network a real name request message for requesting from the network real name status information, which indicates whether the terminal has performed a real name registration;

receiving the real name status information which is returned by the network in response to the real name request message;

displaying the real name status information; and limiting the terminal's use of services according to a saved service control policy, in the case that the real name status information indicates that the terminal has not performed the real name registration, wherein the method further comprises:

before limiting the terminal's use of services in the case that the real name status information indicates that the terminal has not performed the real name registration, sending a service control policy request message to the network, in the case that the terminal determines that the service control policy is not saved thereon or a smart card in the terminal is changed, wherein the service control policy request message is used to request the service control policy.

2. The method according to claim 1, wherein the terminal sends the real name request message to the network in the cases that the terminal has finished network authentication and has not attached to the network, or that the terminal has finished network authentication and has attached to the network, or that the terminal has modified registered real name information, or that the terminal has cancelled the real name registration.

3. The method according to claim 1, further comprising the following step performed by the terminal:

after sending the service control policy request message to the network, directly receiving the service control policy returned by the network; or, acquiring the service control policy according to a memory address at which the service control policy returned by the network is stored.

4. The method according to claim 1, further comprising the following step performed by the terminal:

after sending the real name request message, receiving and saving the real name information and an identifier of the real name information returned by the network, wherein the real name information is saved in the network by the terminal after the real name registration has been performed, and the real name information corresponds to the real name status information.

5. The method according to claim 4, wherein the real name information comprises the identifier of the terminal and user feature information of the terminal.

6. The method according to claim 1, wherein the service control policy comprises at least one of:

limiting a conversation time of the terminal during a time period, or forbidding the terminal from conversation;

limiting a number of short messages sent by the terminal within a time period, or forbidding the terminal from applying short message services.

7. A terminal device, comprising:

a transmitter, configured to transmit a real name request message to a network, wherein the real name request message is used to request from the network real name status information, which indicates whether the terminal in which the transmitter is located has performed a real name registration;

a receiver, configured to receive the real name status information returned by the network in response to the real name request message; and a display, configured to display the real name status information received by the receiver; and a processer, configured to limit the terminal's use of services according to a saved service control policy, in the case that the real name status information received by the acquisition indicates that the terminal has not performed the real name registration, wherein the transmitter is further configured to transmit a service control policy request message to the network, in the case that the service control policy is not saved in the terminal or a smart card in the terminal is changed, wherein the service control policy request message is used to request the service control policy.

8. The apparatus according to claim 7, wherein the transmitter is configured to send the real name request message to the network in the cases that the terminal has finished network authentication and has not attached to the network, or that the terminal has finished network authentication and has attached to the network, or that the terminal has modified registered real name information, or that the terminal has cancelled the real name registration.

9. The apparatus according to claim 7, wherein the transmitter is further configured to directly receive the service control policy returned by the network; or, to acquire the service control policy according to a memory address at which the service control policy returned by the network is stored.

10. The apparatus according to claim 7, wherein the receiver is further configured to receive and save the real name information and an identifier of the real name information returned by the network, wherein the real name information is saved in the network by the terminal after the real name registration has been performed, and the real name information corresponds to the real name status information.

11. The apparatus according to claim 7, wherein the apparatus for acquiring the real name registration status is located in the terminal.

* * * * *